G. L. BLANCHARD.
APPARATUS FOR REMOVING FIBER FROM COTTON SEED.
APPLICATION FILED MAR. 6, 1905.
973,159.
Patented Oct. 18, 1910.
5 SHEETS—SHEET 5.
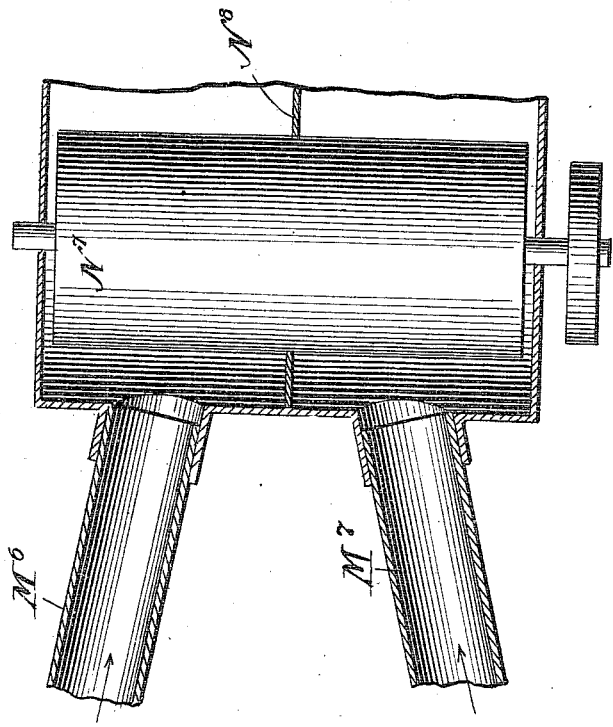
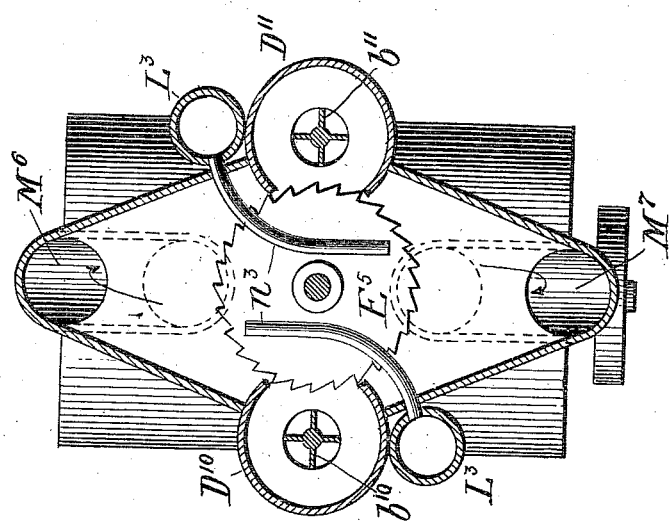
Witnesses:
E. C. Schuermann.
P. Clyde Crust.
Inventor.
George L. Blanchard,
by Hennie & Goldsborough,
Attys.

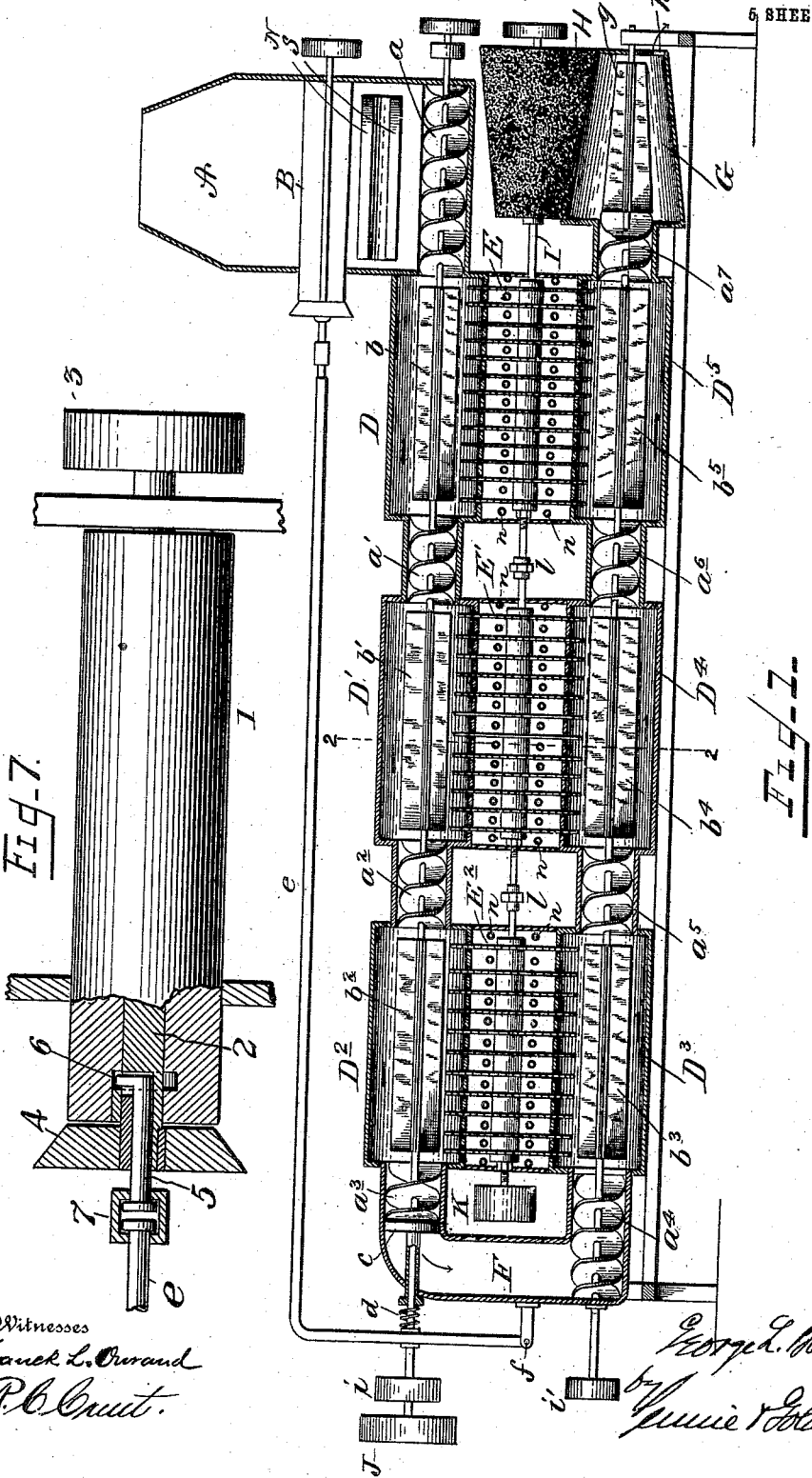

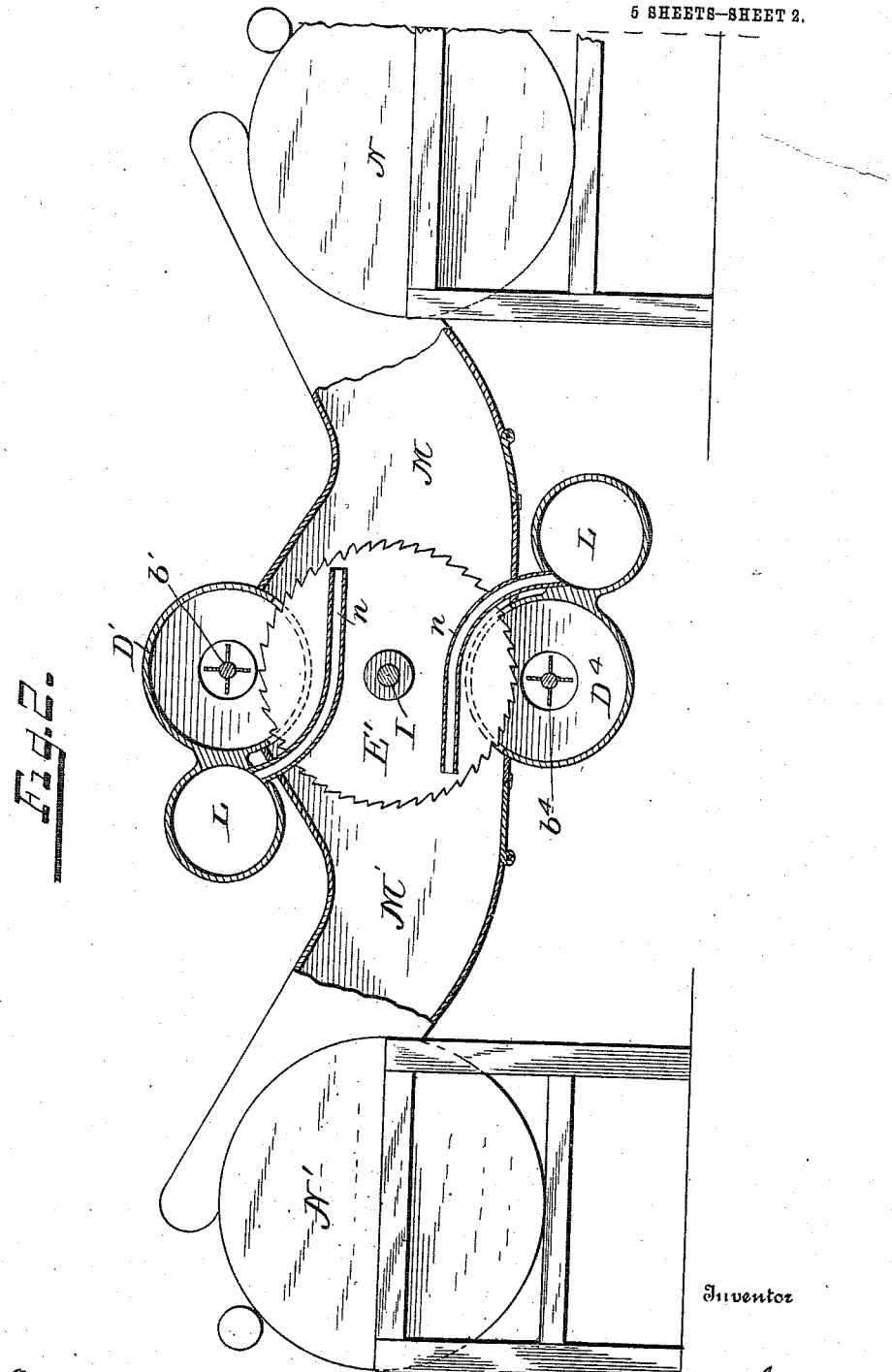

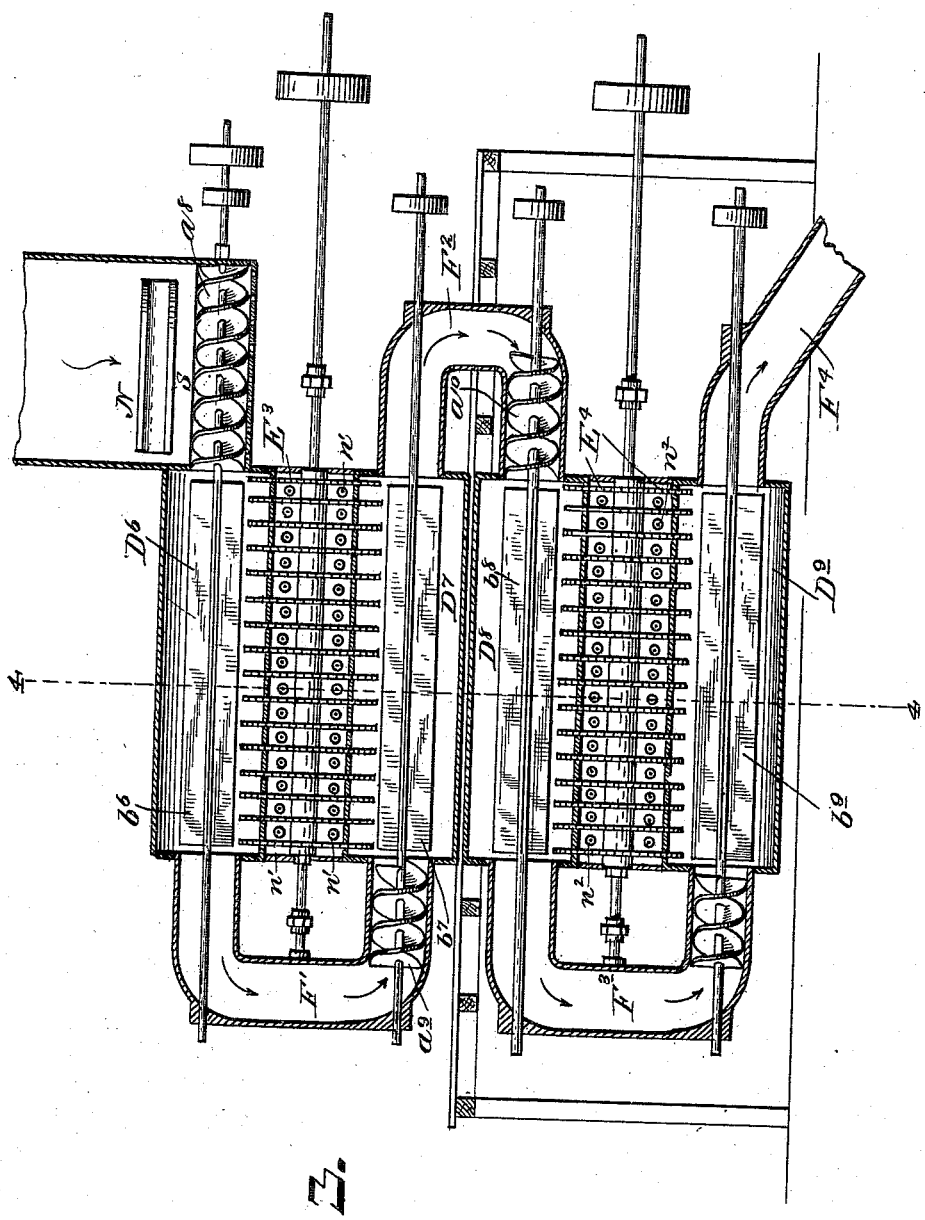

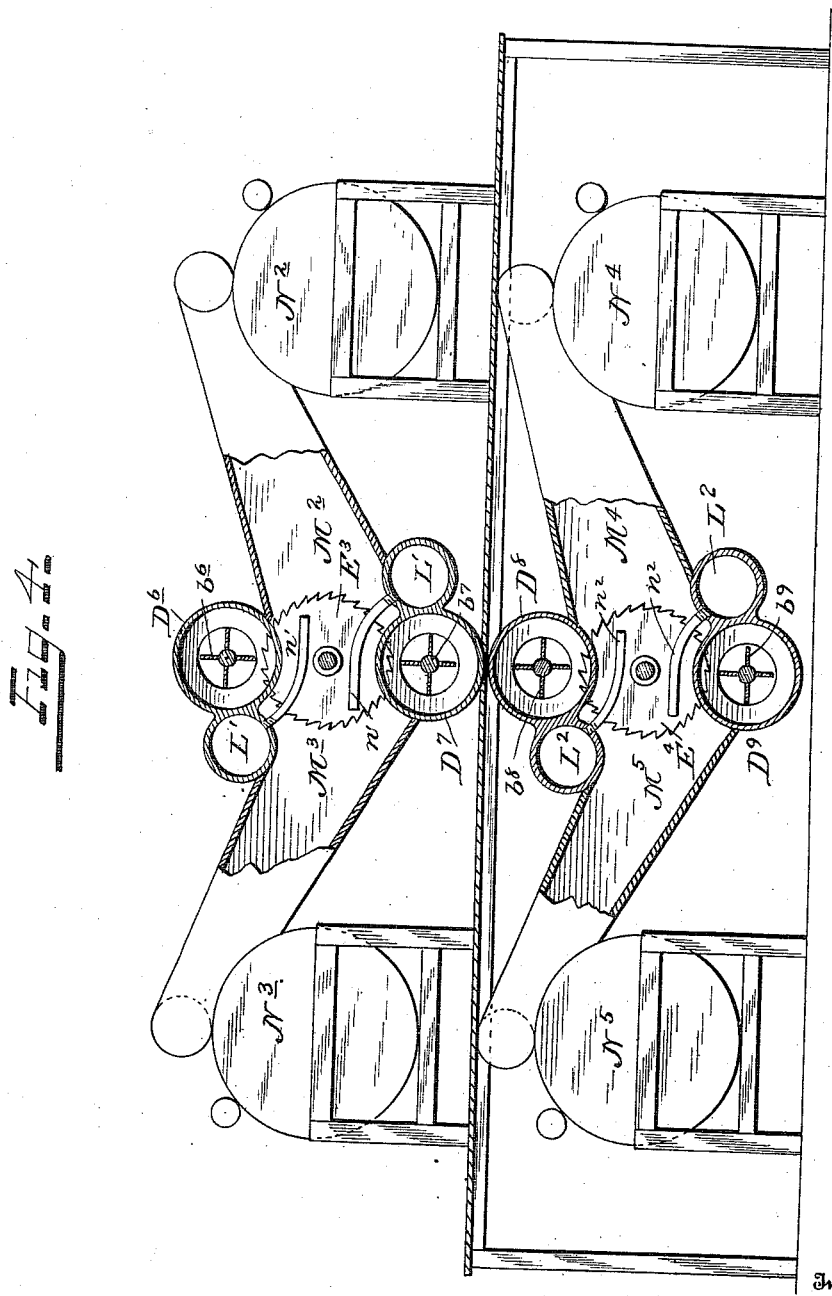

UNITED STATES PATENT OFFICE.

GEORGE L. BLANCHARD, OF MONTGOMERY, ALABAMA.

APPARATUS FOR REMOVING FIBER FROM COTTON-SEED.

973,159. Specification of Letters Patent. Patented Oct. 18, 1910.

Application filed March 6, 1905. Serial No. 248,590.

*To all whom it may concern:*

Be it known that I, GEORGE L. BLANCHARD, a citizen of the United States, residing in the city and county of Montgomery, State of Alabama, have invented certain new and useful Improvements in Apparatus for Removing Fiber from Cotton-Seed; and I do hereby declare the following to be a full, clear, and exact description of the invention, such as will enable others skilled in the art to which it appertains to make and use the same.

My invention relates to certain new and useful improvements in machines for removing fiber from cotton seed and the like. In its general features, it is applicable both to machines for ginning cotton seed or removing the long staple therefrom, and to machines for linting cotton seed subsequent to the usual ginning operation and prior to the extraction of the oil from the seed.

The main characteristic feature of my invention consists in forcing the cotton seed, in a longitudinal direction, through the seed box and past the series of saws coöperating with the seed box, so that the seed, as it passes from the box at the outlet end thereof, has been subjected successively to the action of the series of saws, and so that, as the operation progresses, the new seed admitted follows in the path of that which has gone before, without being indiscriminately mixed therewith, as in the ordinary ginning or linting machine. As a consequence, the defibrating action of the saws upon a given quantity of seed, is very materially expedited, for the reason that the stripped seed is positively expelled from the seed box after passing the last saw of the series, whereas, in the ordinary ginning or linting machine, seeds which have already been substantially stripped, remain, to a greater or less extent, intermingled with the newly admitted seed, to the detriment of the effective action of the saws upon the latter.

In practice, instead of using the irregular roll box of the ordinary ginning or linting machine, I employ as the roll or seed box, a cylindrical tube or pipe, vertically slitted for the passage of the rims of the saw blades, and I arrange the feed screw exterior to the cylindrical seed box, which latter contains the usual rotatory float or roll, whose function is to agitate the seeds during their longitudinal passage through the seed box, and thus insure that all of them shall be subjected to the action of the saws.

In carrying out my invention, I prefer to employ a number of separate series of saws in succession, arranging these series of saws either in horizontal order, or in vertical order, or in two or more tiers, one above the other, each tier having any suitable number of individual members. In these arrangements, I feed the partially ginned or linted seed from the first series of saws to the next number of the series, and so on, and, if desired, I feed the seed reversely to the same series of saws, at a different point in the peripheries of the latter. In this way, I obtain the more and more complete defibration or delinting of the seed, according to the particular exigencies of the case, and I may complete the final cleaning of the seed, before passing it on to the hulling machine, by subjecting it to a scouring operation, conveniently effected through the instrumentality of a conical abrading drum, located at the final outlet of the seed as it passes from the last number of the series of saws.

Instead of removing the fiber from the saw teeth by means of rotary brushes, or by a current of air caused by the rotation of brushes, I prefer to lead off a series of branch pipes from a compressed air main or mains, and to have these pipes discharge currents of air in close proximity to the periphery of the saws, so as to exert an immediate and powerful stripping effect directly upon the saw teeth. The fiber is collected upon condensers of the usual kind, to which lead air trunks from the saw cylinders, and, it is evident that, by suitably disposing the condensers, I may obtain fiber of different quality from the several cylinders of the series, or even from the opposite sides of the same cylinder, when the seed is fed in a reverse direction thereto. In some instances, instead of feeding a reverse stream or current of seed to the saw cylinder or saw cylinders, I may utilize the same multiple effect, by feeding two forward streams or currents of seed to the same cylinder or cylinders at different points in the peripheries thereof. I have also provided means for automatically interrupting the supply of seed to the feed mechanism, under certain conditions, as will be hereinafter more fully set forth.

In the accompanying drawings, I have illustrated various typical arrangements of apparatus embodying the several features of my invention, as will hereinafter more fully appear.

Figure 1 represents, partly in elevation and partly in section, an apparatus embodying the main features of my invention; Fig. 2 represents a section taken on the line 2—2 of Fig. 1, on a somewhat larger scale; Fig. 3 represents, partly in elevation and partly in section, a modified form of apparatus embodying the main features of my invention; Fig. 4 represents a sectional view thereof, on the line 4—4 of Fig. 3; Fig. 5 represents, partly in elevation and partly in section, another modification of the apparatus, showing the main features of my invention; Fig. 6 represents a view, partly in elevation and partly in section, taken on a plane at right angles to Fig. 5, showing the condenser and the connections leading thereto, and Fig. 7 is an enlarged view of the means for feeding the seed to the apparatus.

Similar letters of reference indicate similar parts throughout the several views.

Referring to the drawings, A indicates a supply box, having a regulable supply feed B for governing the amount of seed supplied to the lower part of the supply box, in which is located the conveyer screw $a$, which serves as a forced feed device to feed the seed forward into the cylindrical seed box D, which contains the usual float or blades $b$, whose function is to agitate the seed and bring it into contact with the saws. The seed box D is slitted vertically for the admission of the appropriate portion of the peripheries of the saws, which are the kind ordinarily used in cotton gins or in linting machines, as the case may be. The slow rotation of the feed screw $a$ causes the seed to pass slowly through the seed box D, and to finally issue from the opposite end of the seed box, having been subjected, during its travel, to the action of the individual members of the series of saws E in succession. If sufficiently ginned or linted by this single passage, for the particular purpose at hand, the defibrating operation may stop with the passage of the seed through a single seed box, and the fiber may be collected from the saws upon a single condenser cylinder. In most instances, however, it will be found desirable to subject the seed, as it issues from the first seed box D, to another defibrating operation, carried on in like manner in an adjacent seed box, or to still further defibrating operations, carried on in additional seed boxes of a series. For instance, in the arrangement shown in Figs. 1 and 2, the seed, after passing through the seed box D, enters the next succeeding seed box D', and then passes on to the seed box D², being subjected, in its travel, to the successive action of the saw cylinders E' and E². In this travel, it may be assisted by the action of the feed screws $a'$, $a^2$, intermediate of the seed boxes, although, in some instances, these additional feed screws may be omitted, and reliance had upon the feed screw $a$ to force the seed through the entire series. In the outlet pipe from the seed box D², is preferably located a feed screw $a^3$ on the same shaft with the remaining feed screws and floats $b$, $b'$, $b^2$. The forwardly traveling stream of seed, in issuing from the seed box D², encounters the sliding abutment $c$, normally held in the position indicated in Fig. 1 by means of the spring $d$. The impact of the seed against the disk, brings about a regulation of the feeding action of the feed devices B, through the instrumentality of the shifting rod $e$ connected to govern the supply device and hinged at $f$. The tension of the spring is regulated by the pressure of the seed upon it, and its movement is communicated by the rod $e$ in such manner as to automatically regulate the flow of seed through the supply box A.

To describe the feed device B more in detail, it consists of a drum 1 loosely mounted upon a shaft 2 to which is secured the driving pulley 3 and the friction driving wheel 4. Extending into a slot in the shaft 2 is a shaft 5 having a lug 6 extending outwardly through a lateral aperture in the shaft and engaging in a circular groove in the feed roll. This shaft 5 is connected with the rod $e$ by a swiveling connection 7. It will now be observed that upon a pull being exerted upon the rod $e$, the shaft 5 will be drawn outwardly and the end of the feed roll 1 will be tightly pressed against the lateral face of the friction wheel 4. The roll will then be carried with the friction wheel. Except however when a pull is exerted upon the rod $e$, the feed roll 1 will not turn, the shaft 2 turning loosely within it. The pull upon the rod $e$ is caused by the accumulation of seed at $a^3$, produced by pressure of the seed upon the piston $c$, which is forced backward, thereby governing the admission of an additional regulated quantity of seed into the apparatus. After the pressure is released from the piston $c$, the piston is forced forward to its former position by means of the spring $d$ which carries the rod $e$ with it, and this in turn reduces the feed. In the construction shown in Figs. 1 and 2, the seeds now drop through the pipe F into the feed screw $a^4$, and thence pursue a retrograde or reverse course through the seed boxes D³, D⁴, and D⁵ of the lower series, these several seed boxes being provided with floats $b^3$, $b^4$, and $b^5$, and the passage of the seed being preferably assisted by the feed screws $a^5$ and $a^6$. The same saw cylinders are, therefore, employed to act upon the seed at another portion of their peripheries, and, it is evident that they may act upon the same seed which has already passed through the upper series of seed boxes, or that they may be employed to act upon an entirely different body of seed, as the case may be. The several seed boxes of the series are rotatable upon their axes to a degree sufficient to permit of their adjustment, so that when the vertical slits wear at their lower edges, a rotary adjustment of the cylinders will prevent the seed from falling out, which might otherwise occur to a greater or less extent. At their final exit from the seed box $D^5$, a feed screw $a^7$ conveys the seed into a conical receptacle G, provided with a float $g$ and having an exit opening $h$. Above this conical receptacle G, is located the abrading roll H, upon the saw shaft I, the function of this abrading roll being to scour the seed before they are passed on to the hullers for subsequent crushing operations. The surface of the roller H is provided with some abrasive substance, such as sand, emery, carborundum, or similar material. The floats in the seed pipes are revolved at a speed of from 600 to 800 revolutions per minute, through the intermediacy of the driven pulley J, which is belted to the shaft of the lower series of floats by means of the belt pulleys $i$, $i'$. The saw cylinder shaft is driven from a separate pulley K at a speed of 1,000 revolutions per minute, and couplings $l$ are provided between the several saw cylinders so as to throw any one of the cylinders out of operation when desired.

The lint or fiber cut from the seed in the top seed box D, is of better quality than that derived from the subsequent top seed boxes $D'$, $D^2$, or from the lower seed boxes $D^3$, $D^4$, $D^5$. The fiber may, therefore, be collected from these several seed boxes separately, or from two or more of them conjointly, so as to get different grades of fiber, as may be desired.

Instead of collecting the lint or fiber from the saw teeth in the usual manner, I contemplate delivering a blast of air nearly at the point of contact of the teeth of each saw with the seed. To this end, I may conveniently arrange an air supply trunk or trunks L, longitudinally of the apparatus, as indicated in cross section in Fig. 2, and lead from this a series of blast pipes $n$, delivering a blast or blasts of air to each saw. The air is supplied by a suitable fan, and the lint or fiber is blown from the saw teeth and through the trunks M, M' to the condensers N, N' respectively. In this particular arrangement, therefore, as illustrated, the lint or fiber from the upper series of seed boxes is collected upon a separate condenser from the one which collects the lint or fiber from the lower series of seed boxes.

Whenever it is desired to remove either one of the saw cylinders for sharpening the saws, the condencers' trunks are disconnected, the condensers removed, the saw cylinders uncoupled by releasing the couplings $l$, and the saw cylinders may then be lifted out bodily.

A magnet or series of magnets N S may be interposed between the supply feed B and the feed screw $a$, for the purpose of attracting and holding any nails, pieces of wire, or the like, which would otherwise tend to injure the saws, if admitted into the seed boxes. If desired, also, the bottoms of the pipes within which the several feed screws operate, may be made of perforated metal to permit any sand to escape which is mixed with the seed.

In the form of the invention illustrated in Figs. 3 and 4, the feed screw $a^8$ supplies an initial seed box $D^6$, provided with a float $b^6$, and the seed, after dropping through the down-take F', is fed by the feed screw $a^9$ to the seed box $D^7$, provided with the float $b^7$. In this travel, the seed is subjected twice to the action of the saws of the cylinder $E^3$, and to the action of the blast pipes $n'$ from the air mains L', so that the fiber detached during the passage of the seed through the upper seed box, passes through the trunk $M^2$ to the condenser $N^2$, and the lower grade of fiber, taken from the seed during its passage through the seed box $D^7$, passes through the trunk $M^3$ and is collected upon the condenser $N^3$. From the seed box $D^7$, the seed may then, if necessary, pass through the pipe $F^2$ to the feed screw $a^{10}$, and thence through the seed box $D^8$, the pipe $F^3$ and the seed box $D^9$ to the final outlet $F^4$, being subjected, in its travel, to the operation of the saws of the cylinder $E^4$ and to the agitating action of the floats $b^8$, $b^9$. The lint or fiber will, as before, be blown from the saws by an air current supplied from air mains $L^2$ and branch blast pipes $n^2$, and will be collected separately, passing through the trunks $M^4$ and $M^5$, respectively, and being collected by the condensers $N^4$ and $N^5$.

In the form of the invention illustrated in Figs 5 and 6, the seed boxes $D^{10}$, $D^{11}$, with their floats $b^{10}$, $b^{11}$, are located at opposite sides of the saw cylinder $E^5$ and in the same horizontal plane, the air for stripping the saws being supplied from the air mains $L^3$, through the branch pipes $n^3$. The trunks $M^6$, $M^7$ lead to the rotary condenser cylinder $N^7$, which is divided into two separate compartments by the dividing partition $N^8$, so that one grade of fiber is received upon the upper portion of the cylinder, and another grade on the lower portion.

It will be evident that by the system outlined in this specification, the operations of cotton ginning and cotton linting, which are customarily practiced in entirely different machines, can be conveniently combined so that the process may be a continuous one. In such a combined system, the function of the preliminary cylinder or cylinders would be to gin the cotton seed, in the sense of stripping from it its longer fiber and collecting that fiber separately, and the function of the succeeding cylinder or cylinders would be to effect the linting of the cotton seed, in the sense of removing from it the short fibers, ordinarily denominated as lint.

What I claim is:—

1. In a machine for removing fiber from cotton seed, a closed cylindrical seed box, having an inlet opening at one end and an outlet opening at the other end, means external to the box for feeding the seed into the inlet opening thereof, a series of defibrating saws projecting through circumferential slots for only a short distance into said box, and a rotatable float board extending axially of the interior of said box; substantially as described.

2. In a machine for removing fiber from cotton seed, a closed cylindrical seed box, having an inlet opening in one end and an outlet opening at the other end, a conduit registering with the inlet opening, a driven shaft extending axially of the conduit and box, a feed screw on the shaft within the conduit, a float board on the shaft within the box, and a series of defibrating saws projecting through circumferential slots for only a short distance into said box; substantially as described.

3. In a machine for removing fiber from cotton seed, a series of defibrating saws, and means for rotating them, in combination with seed boxes located at opposite sides of said saws and into which the peripheries of said saws project into the path of the seed to strip the fiber therefrom, means for feeding the seed longitudinally through the two boxes in succession, and means located in the space between the boxes to strip from the saws the fiber collected in each box, whereby fiber of different grades may be separately removed by the same saws; substantially as described.

4. In a machine for removing fiber from cotton seed, a series of defibrating saws, and means for rotating them, in combination with seed boxes located at opposite sides of said saws and into which the peripheries of said saws project into the path of the seed to strip the fiber therefrom, means for feeding the seed longitudinally through said boxes, and means located in the space between the boxes to strip from the saws the fiber collected in each box, whereby fiber of different grades may be separately removed by the same saws; substantially as described.

5. In a machine for removing fiber from cotton seed, seed boxes having each an inlet opening at one end and an outlet opening at the other end, defibrating saws projecting within said boxes into the path of the seed to strip the fiber therefrom, means for feeding the seed into the inlet openings thereof and longitudinally through the boxes past the defibrating saws, and means for separately removing from the saws and collecting the fiber at different stages in the progress of the seed past the saws, whereby the different grades of fiber are separately removed and collected; substantially as described.

6. In a machine for removing fiber from cotton seed, a number of series of defibrating saws, a plurality of sets of seed boxes located on opposite sides of the respective series of saws and into which the peripheries of said saws project into the path of the seed to strip the fiber therefrom, a float within each box to agitate the seed and bring it into contact with the saws, and means external to the boxes for feeding the seed from box to box; substantially as described.

7. A machine for removing fiber from cotton seed, provided with a plurality of series of saws, two separate series of seed boxes, discharging into each other and coöperating with opposite portions of the saws' peripheries, means for feeding the seed longitudinally through both series of boxes, and means operated by the moving body of seed for controlling the supply of seed to the first series; substantially as described.

8. A machine for removing fiber from cotton seed, provided with a plurality of series of saws, two separate series of seed boxes, discharging into each other and coöperating with opposite portions of the saws' peripheries, means for feeding the seed longitudinally through both series of boxes, and means operated by the moving body of seed for controlling the supply of seed to the first series, said means consisting of a movable head or abutment normally held in an advanced position in the path of movement of the seed as it passes from the final member of the first series of boxes, and a lever operated by said abutment and controlling the seed supply to the initial member of that series; substantially as described.

9. In a machine for removing fiber from cotton seed, a seed box having an inlet opening at one end and an outlet opening at the other end, and means for feeding the seed into the inlet opening thereof and longitudinally through the box to the outlet opening, in combination with a supply hopper associated with the inlet feeding means, and mechanism actuated by the seed discharged at the outlet opening to control the supply of seed through the hopper; substantially as described.

10. Mechanism for finally linting cotton seed, comprising a receptacle for the seed, mechanism for forcing the seed into said receptacle, an agitator within the receptacle and an abrading roller projecting through the wall of the receptacle into contact with the seed therein; substantially as described.

11. Mechanism for finally linting cotton seed, comprising a conical receptacle for the seed, mechanism for forcing the seed into said receptacle, an agitator within the receptacle, and a conical abrading roller projecting through the wall of the receptacle into contact with the seed therein; substantially as described.

12. A machine for removing fiber from cotton seed, provided with oppositely disposed seed boxes, an intervening series of saws, means for feeding the seed longitudinally and successively through the oppositely disposed seed boxes, and condenser trunks leading in opposite directions from opposite portions of the peripheries of the saws; substantially as described.

13. A machine for removing fiber from cotton seed, provided with oppositely disposed seed boxes, an intervening series of saws, means for feeding the seed longitudinally and successively through the oppositely disposed seed boxes, and condenser trunks leading in opposite directions from opposite portions of the peripheries of the saws and provided with separate condensers; substantially as described.

14. A machine for removing fiber from cotton seed, provided with a series of saws, a seed box for subjecting the seed to the action of the saws at one portion of their peripheries, and a second box for subjecting the seed to the action of the saws at another portion of their peripheries, and means for collecting separately the fiber from each box; substantially as described.

In testimony whereof I affix my signature, in presence of two witnesses.

GEORGE L. BLANCHARD.

Witnesses:
 CHAS. D. ARMSTRONG,
 LIONEL A. MOORE.